Fig 4A
CLAMPING CIRCUIT

Fig 4B
PATCH FOLDING CIRCUIT

Fig. 4C CLAMP FEEDING CIRCUIT

Fig. 4D SEWING CIRCUIT

Fig 4E
CLAMPS UP CIRCUIT

United States Patent Office 3,572,266
Patented Mar. 23, 1971

3,572,266
CONTROL DEVICE FOR REECE POCKET
WELTING MACHINE
Rodney W. Champney, El Paso, Tex., assignor to Farah
Manufacturing Company, Inc., El Paso, Tex.
Filed July 29, 1969, Ser. No. 845,711
Int. Cl. D05b 3/10
U.S. Cl. 112—65                                    6 Claims

ABSTRACT OF THE DISCLOSURE

An improved control device has been provided for a sewing machine used to sew welts or piping such as for pants back pocket and button hole piping. The pocket welting machine is commonly known as a Reece pocket welting machine and is provided with control devices which require considerable skill from an operator. The novel circuit control device is a combination of a relay circuit and appropriately co-acting delay and control circuits which eliminate a number of operator controlled machine events and provide for improved sequencing. Production rates obtainable with the thus modified machines have been outstanding.

This invention relates to a sewing machine for welting various garment openings such as button holes or pockets; more particularly, this invention pertains to control devices for a sewing machine used in welting pants back pockets whereby the machine is provided with improved control devices and can be operated in an improved manner by eliminating a number of awkward operator activated steps and delay causing steps associated with the means previously used to control the sewing machine.

In producing pants in an economic fashion, the various steps which are required to assemble these articles are often carried out on operator attended sewing machines which perform a multitude of sewing operations. Hence, the manufacture of pants has a large labor component. As some of the machines during their operation require from the operator intense concentration and high degree of coordination, it has been a desideratum in the industry to simplify the operation of these sewing machines.

A number of reasons exist why these machines need to be modified. The more obvious are such as reduction of training period, utilization of less skilled persons, elimination of delay causing operations, reduction of labor component associated with the manufacture of each garment, elimination of fatigue causing steps and subjecting a number of awkward operator controlled steps to more precise automated control devices, etc.

A proper and acceptable incorporation of a back pocket blank into pants is a time consuming operation requiring specially designed machinery. A back pocket of pants is generally made before the garment is finally sewn together. It is accomplished by sewing a pocket blank which has a facing patch, i.e. a patch which is generally the same as the pants fabric and is visible through a pocket opening. For obtaining a welt which defines the opening of the pocket, a welt producing patch is placed on the front side of the fabric. This patch is made of two plies. The first is the welt producing ply and the second is a backing ply for the same.

A rather complicated sewing operation is performed on these three components to make a pants back pocket, especially if a high quality welting construction is sought to be incorporated in pants.

Figure 1A:
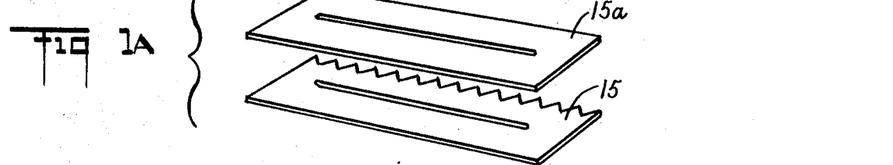
Figure 1B:
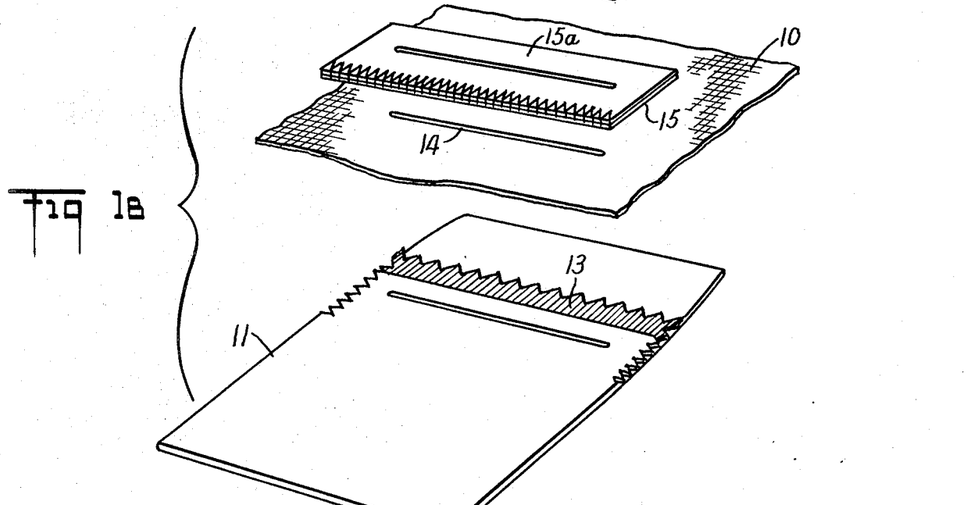
Figures 2, 3:
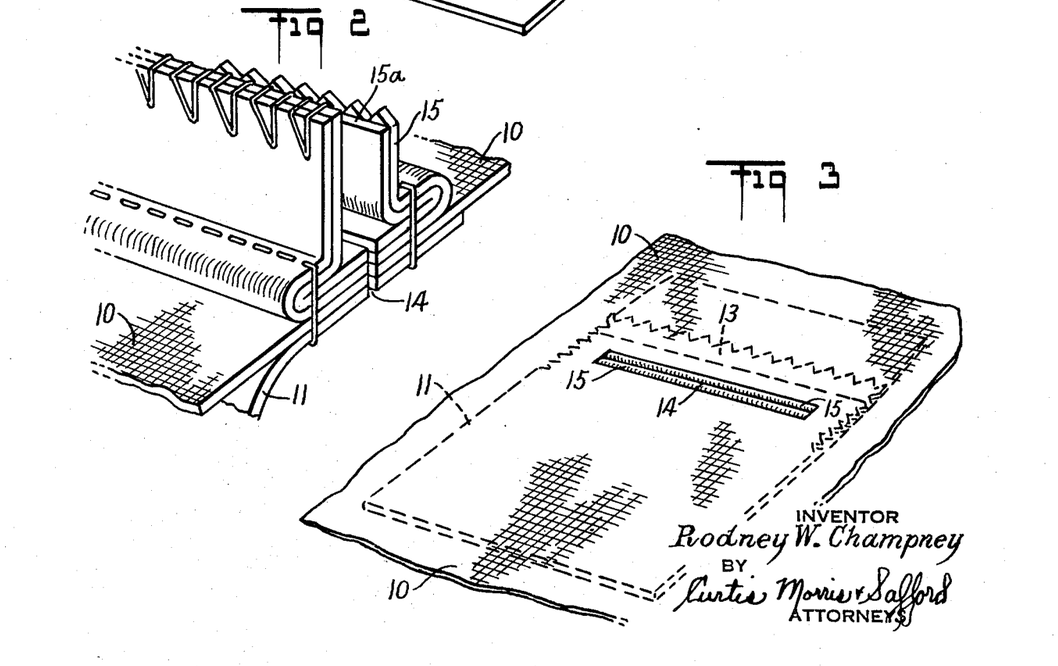

Thus, for ready understanding of the back pocket construction, reference is made to FIG. 1a wherein a welting patch construction is shown and FIG. 1b wherein a perspective blowup depicts the assembly of welted back pocket components; in FIG. 2, the welt construction is shown in cross-section before the welt patch is inverted. In FIG. 3 the incorporated back pocket blank is illustrated as it appears from the outside of the pants leg. The fabric forming the garment leg is identified as 10, onto the reverse side of this fabric a back pocket blank or a pocket pouch 11 is affixed. The back pocket blank 11 carries, on the inside thereof and facing the pants fabric, a patch 13 corresponding to the fabric material employed in the pants and which patch is exposed to the outside through the pocket slit 14. This patch 13 is called a "facing patch." Another patch, i.e. the welting patch 15 is placed on the outside of the pants fabric 10, the welting patch has a backing ply 15a sewn to it.

The welting patch forms the piping or welt 16 as illustrated in FIG. 3 around the pocket opening and, again generally corresponds to the same fabric material as used in the pants. In forming the welt, the welting patch is clamped to the outside of fabric 10, folded in an inverted T-shape as shown in FIG. 2 and a line of stitches run along each of the longitudinal edges of the line defining the upper or transverse portion of the T. While the stitching is carried out, a machine operated knife blade slits the fabric defining the pocket opening 14. After the completion of the slitting operation, machine operated fingers protrude through the slit from the reverse side of the pants fabric and capture the welt patch 15 and its backing ply 15a and invert the same, defining the welt surrounded pocket opening as depicted in FIG. 3.

In order to understand the present invention, reference is made to U.S. Pat. 2,573,359 which patent is incorporated by reference herein for relating this invention to the existing sewing machine employed in this art to accomplish the above-described operation. Further, in order to simplify the understanding of the invention and as an amplification of U.S. Pat. 2,573,359, reference is made to a trade publication, Reece Series PW Pocket Welting Machine Instruction Manual, second edition, The Machine Instruction Manual, second edition, The Reece Corporation, 200 Prospect St., Waltham, Mass.

For ease of understanding the present invention, and supplementing the above described back pocket welting operation, reference is also made to FIGS. 1 to 17 of said U.S. Pat. 2,573,359 which explain the objectives sought to be accomplished when sewing a welt to a garment, e.g. a back pocket on pants. Further, reference is made to the description of the mechanical system as well as the electrical control system which is set forth in this patent the latter in columns 21 to 24 and illustrated in FIGS. 69 to 73.

However, beyond the described operation in the cross-referenced material the sewing machine circuits are modified to accomplish the present objectives: (a) eliminate the complicated foot switch operation employed with the previous pocket welting machines, (b) eliminate the knee lever switch operation associated with the prior art machines, and (c) sequenqce the sewing machine operation to eliminate delays in the sewing operation.

Turning now to the invention, the electrical circuits illustrated on pages 31, 34, 38, and 51 of Reece Instruction Manual (and now depicted in FIGS. 4a to 4e herein) are modified by introducing control means which are operatively interconnected to the clamping circuit, patch folding circuit, clamp feeding circuits, sew circuit, and "clamps up" circuit of the pocket welting sewing machine and are activated by a foot switch provided herein.

For ready background of the invention, reference is made to the drawings wherein:

The present invention is described in reference to the following drawings, wherein:

FIG. 6 illustrates a circuit diagram as another, preferred embodiment of the invention and interrelated to the sewing machine control means illustrated in FIGS. 4a to 4e.

The control device will be explained by describing what transpires in the electrical circuit device and what mechanical means are activated when a foot controlled switch is actuated by the operator.

In order to understand the mechanical means, reference is made to FIG. 30 et seq. of U.S. Pat. 2,573,359.

INITIAL POSITION OF THE SEWING MACHINE

According to the invention herein, material clamps illustrated as 7 in FIG. 31 of said patent are raised and the sewing table 6 or work table shown in this FIG. 31 of this patent is rearwardly. This position of the sewing table 6 is necessary to allow the placing of a pocket blank and the leg fabric in the machine and to start properly the sewing operation as the table 6 feeds forwardly.

Figure 5:
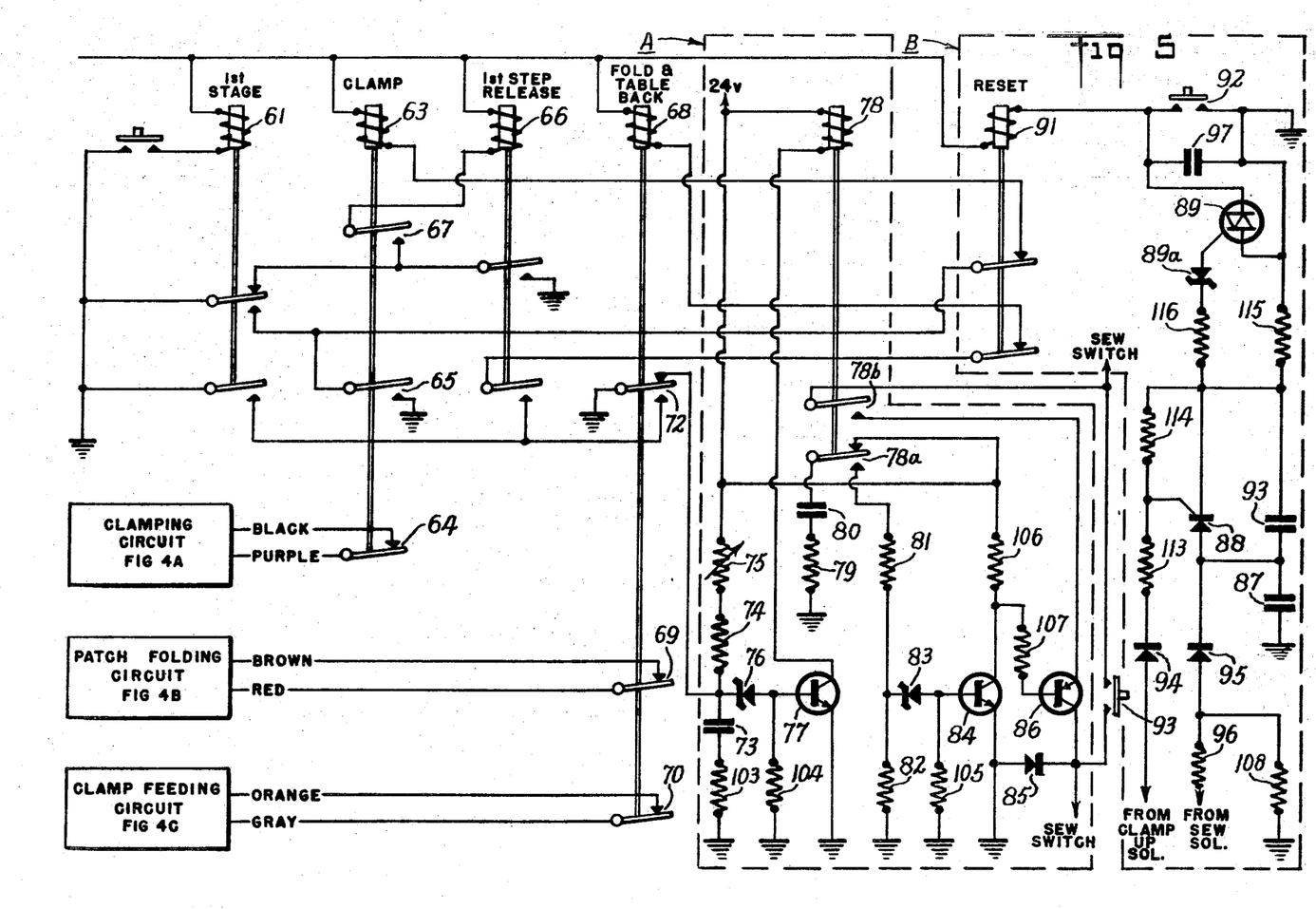
FIG. 5 illustrates a circuit diagram as an embodiment of the invention and interrelated to the sewing machine control means illustrated in FIGS. 4a to 4e.

In reference to FIGS. 5 and 6 herein, all relays in the novel circuit, i.e. 61, 63, 66, 68, 69, 91, 98 and 101 shown in these figures are deenergized (up position of the switch). The wire connections which in the prior art device lead to the foot switch are illustrated by the boxes described with the appropriate legends in FIGS. 5 and 6.

SECURING OF POCKET BLANK AND LEG FABRIC

First depression of foot switch

Further, in reference to FIGS. 5 and 6 herein, foot pedal switch is momentarily depressed, which operation is to lower the clamps 7 (not shown herein) to hold the material in place as follows:

(1) Upon the momentary depression of the foot switch, relay 61 is energized which in turn energizes relay 63.

Figure 4A:
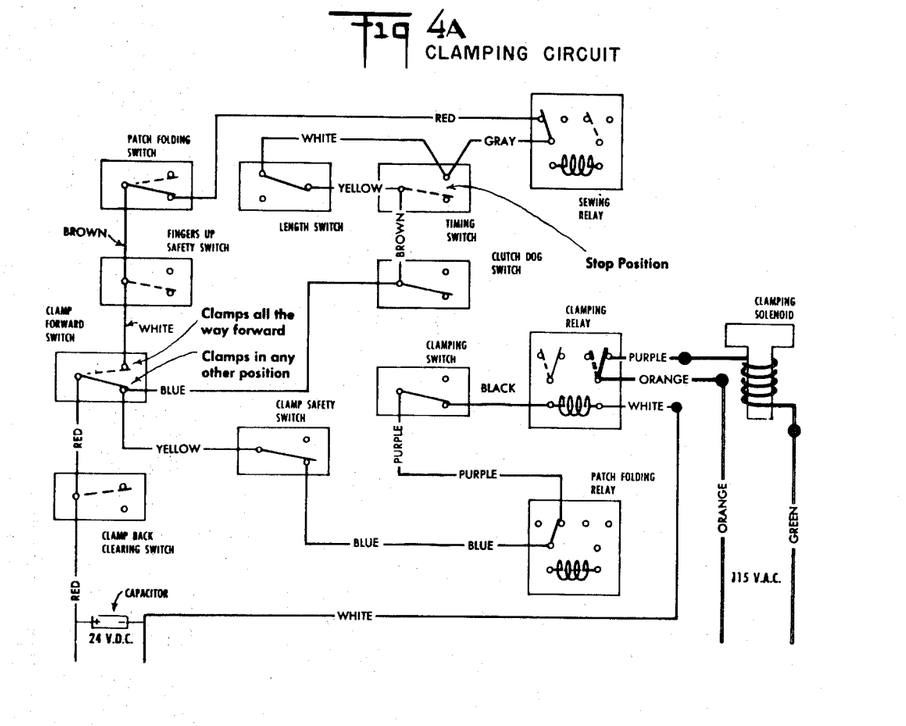
FIG. 4a shows an electrical control device of the conventional type and designated as "Clamping Circuit" used with the above referred to sewing machine which is operatively interconnected to a foot switch and the novel means for closing and opening the workpiece clamps in general described in the above patent and corresponds to the circuit illustrated on page 31 of the Reece PW Instruction Manual.

(2) The 64 contacts of relay 63 operate to lower the clamping relay shown in FIG. 4a with the circuit operatively interconnected with circuits shown in FIGS. 5 and 6 herein by eliminating the switch in FIG. 4a and designated "Clamping Switch." This means in FIG. 4a operate appropriate hydraulic devices, described in the above-mentioned patent but not shown herein, thus lowering the clamp 7.

(3) The 65 contacts of relay 63 are used to latch the clamping relay leaving it energized when relay 61 is deenergized.

(4) Relay 66 is energized when relay 63 is energized via 67 contacts of relay 63 and when relay 61 is deenergized.

(5) The welt defining patch consisting of plies 15 and 15a is placed in the machine on the material secured by clamp 7 of FIG. 31 of said U.S. Pat. 2,573,359.

Second depression of foot switch

Upon the second depression of the foot switch, three machine steps take place:

(a) The patch folding arms 9 illustrated in the machine of FIG. 30 of U.S. Pat. 2,573,359 and patch guide 86 as illustrated in FIG. 13 of same patent engage the welting patch for sewing;

(b) The sewing is started by moving forwardly and automatically work plate 6 (toward the head of the machine); and (c) A lock step operation is set in motion with start of sewing.

Figure 4B:
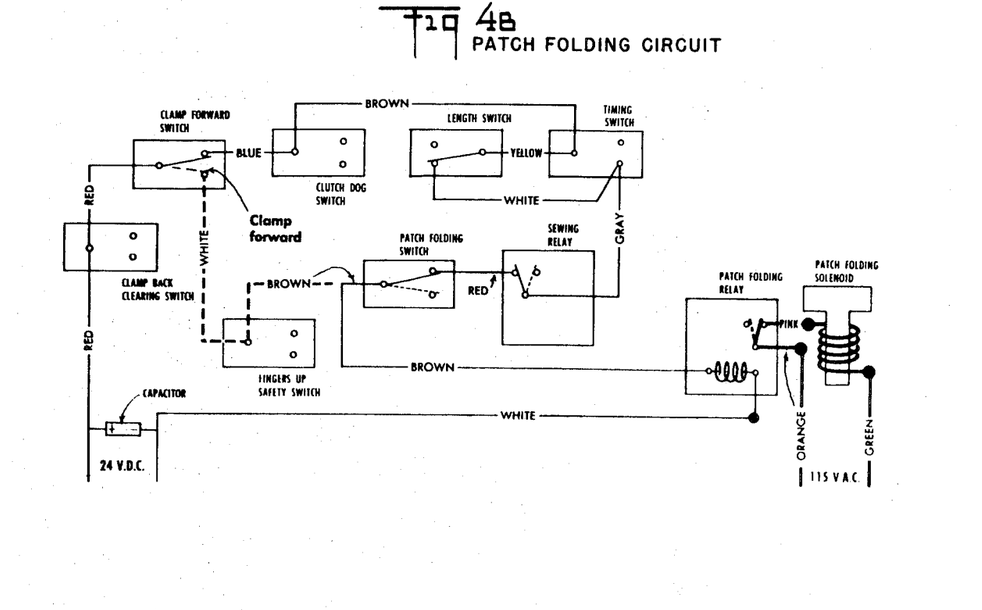
FIG. 4b shows an electrical control device of the conventional type and designated as "Patch Folding Circuit" which is operatively interconnected to a foot switch and the novel means for closing and opening welting patch folding arms. This device is described in general terms in the above patent and corresponds to the circuit illustrated on page 32 of the Reece PW Instruction Manual.

These three events are accomplished as follows:

(1) Relay 68 is energized, which activates the welting patch folding circuit via relay contacts 69 shown in FIG. 4b and illustrated schematically by a box in FIGS. 5 and 6 and labeled accordingly. These circuits are interrelated by eliminating the switch designated in FIG. 4b as "Patch Folding Switch."

Figure 4C:
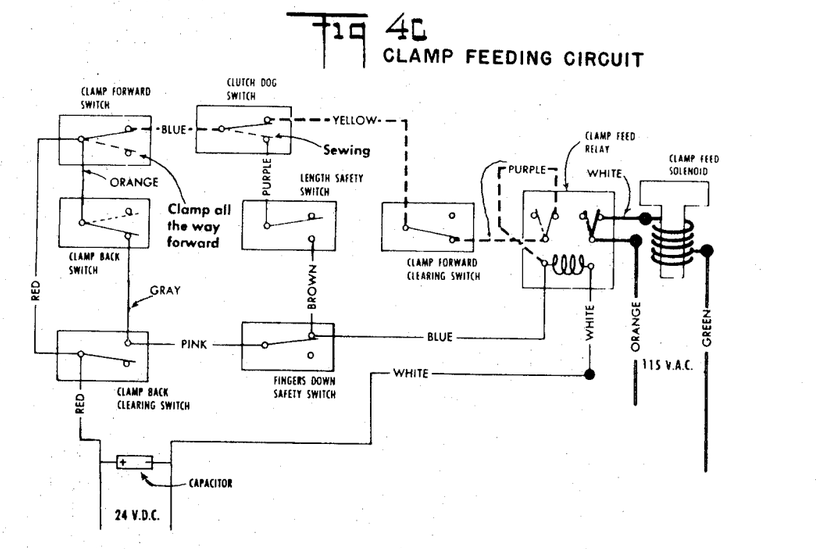
FIG. 4c shows an electrical control device of the conventional type and designated as "Clamp Feeding Circuit" which is operatively interconnected to a foot switch and the novel means for controlling the clamp operation in combination with the other novel means provided herein. This device is described in general terms in the above patent and corresponds to the circuit illustrated on page 34 of the Reece PW Instruction Manual.

(2) When relay 68 is energized, it also activates the "Clamp Feeding Circuit" illustrated in FIG. 4c via relay contacts 70. The latter also eliminates the switch designated as "Clamp Back Switch" in FIG. 4c. This switch as explained herein and together with the "Clutch Dog Switch" and "Clamp Feed Relay" shown in FIG. 4c cooperate in the sequence of feeding the sewing table 6 forwardly when sewing starts as well as stopping the table in a manner well known in the art and as explained in the cross-referenced material except for relay circuits explained immediately below.

Figure 4D:
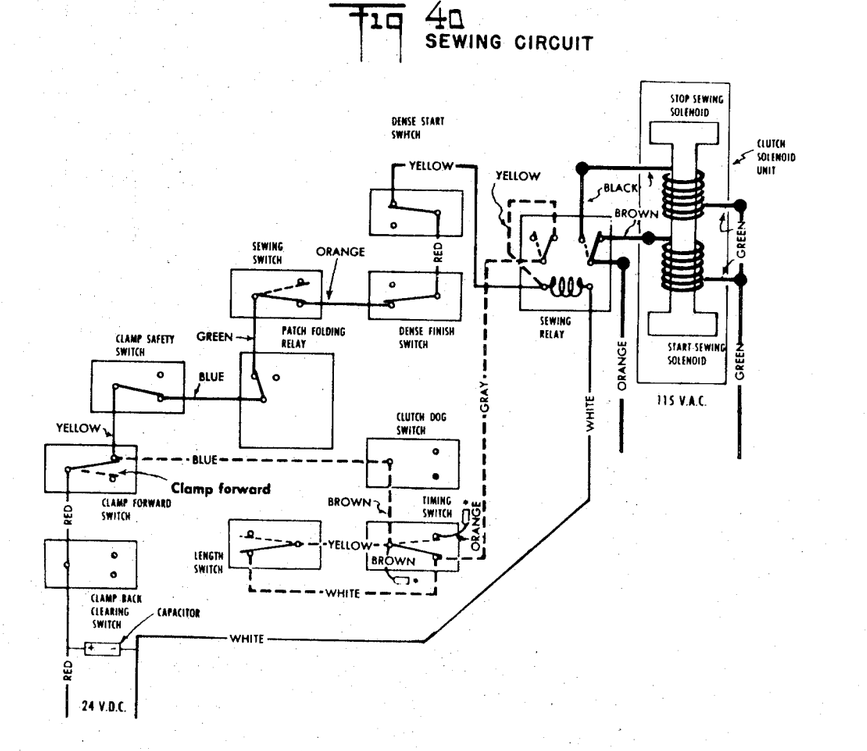
FIG. 4d shows an electrical control device of the conventional type and designated as "Sewing Circuit" which is operatively interconnected to a foot switch and the novel means for controlling the sewing operation as well as the novel means to return the machine for repeated operation. This device is described in general terms in the above-identified patent and corresponds to the circuit illustrated on page 38 of the Reece PW Instruction Manual.

(3) Relay 68 also activates a delay circuit enclosed with dashed lines in FIGS. 5 and 6 and labeled "A"; this delay is necessary to postpone the initiated cycle, set in motion in a lock-step manner when relay 68 was energized, by (1) postponing the sewing cycle for at least 20 milliseconds in order to allow the patch folders 9 shown in the above identified patent to operae and (2) to latch the sew solenoid relay illustrated in FIG. 4D by means provided in the prior art circuit and (3) to set in motion the termination of a dense stitch forming pattern along the seam forming the welting at the initial porions of the pocket opening. The sewing machine is locked in a dense stitch pattern simultaneously with the start of the sewing cycle in a manner explained in the cross-referenced material. However, the dense stitch pattern must be allowed to be converted to a normal stitch pattern.

(1) This first delay event is accomplished as follows:

(i) when relay 68 is energized the second depression of the foot switch it removes the ground from the sew delay circuit via its 72 contacts;

(ii) a charging path is established from the 24 volt D.C. source through resistances 74 and 75 allowing the capacitor 73 to be charged;

(iii) when the voltage of capacitor 73 reaches the breakdown voltage of the Zener diode 76, transistor 77 is provided with base drive allowing it to conduct and energize relay 78 which accomplishes the first delay. Transistor 77 continues to be base biased via Zener diode 76 and resistance 104 and holds the relay 78 energized.

(2) The second delay event which is to accomplish the latching of the sew solenoid relay and to allow the termination of the dense stitch pattern is about 100 milliseconds and is accomplished as follows:
(i) before relay 78 is energized, i.e. before the foot switch is operated the second time, transistors 84 and 86 are both nonconducting;
(ii) when relay 78 energizes, capacitor 80 discharges through the 78a contacts of relay 78, through resistances 79, 81 and 82 and base biases the transistors 84 which in turn allows base biasing of transistor 86 and activates the "Sewing Switch" and also concurrently the "Dense Start Switch" shown in FIG. 4d. This in turn provides the delay time for latching the "Sewing Relay" shown in FIG. 4d;
(iii) when the voltage of capacitor 80 drops below the breakdown voltage of Zener diode 83, the transistors 84 and 86 stop conducting. These transistors stop conducting prior to terminating of the dense stitch pattern. The dense stitch pattern is terminated by opening of the "Dense Start Switch" illustrated in FIG. 4d and also described in the prior art in respect to the operation of this sewing cycle.

In the "Reset" circuit further explained herein, relay 68 when de-energized and its 72 contacts provide the path for discharging capacitor 73 and de-energizing relay 78. The 78a contacts of relay 78 when de-energized provide the path for recharging capacitor 80. The remaining sewing cycle is accomplished with the circuit control devices provided with this machine.

As it was mentioned before, the second depression of the foot switch starts the actual sewing operation, which is delayed by the two events, i.e. first to allow the welting patch folding arms to fold the patch and the second to allow the breaking of the dense stitch pattern.

In the prior art device, the sewing starts when the work table 6 illustrated in the above-mentioned patent has been moved all the way back and the knee lever depressed, the last activating the "Sewing Switch" shown in FIG. 4d.

According to the present invention, the sewing table is moved rearwardly and sewing does not normally start at that point, but only after the transistors 84 and 86 start conducting and latch the "Sewing Relay," the sewing circuit is activated via the switch entitled "Sewing Switch" in FIG. 4d which, besides the above described functions, also is timed by the second delay event to provide for automatic latching, by means of the 24 volt holding circuit shown by the dashed lines illustrated in FIG. 4d, the "Sewing Relay" until the switches designated in FIG. 4d as "Timing Switch" and "Length Switch" break the circuit at the end of sewing cycle. In summary, the lock step or interlocked sequential operation is initiated upon second depression of the foot switch when relay 68 is energized and it consists of activating welting "Patch Folding Circuit" via relay contacts 69, further activating the "Clamp Feeding Circuit" via contacts 70 of relay 68, and the activating of delay circuit A shown in FIGS. 5 and 6 through contacts 72 of relay 68. The last activation as part of the initiated, lock stepped sequence also (1) postpones the sewing cycle, (2) latches the sew solenoid and (3) sets in motion the circuit for terminating of the dense stitch forming pattern. Further, this initiation starting with the energizing of relay 68 as explained immediately above, provides for automatic latching by means of the 24 volt holding circuit shown in FIG. 4D, the "sewing relay" until the switches designated in FIG. 4D as "timing switch" and "length switch" break the circuit at the end of the sewing cycle. Finally, as part of the lockstep operation, the reset circuit illustrated in FIG. 5 or 6 as B is activated as explained under the heading "Reset Circuit" resets the machine automatically.

RESET CIRCUIT

This circuit illustrated in FIG. 5 as "B" is provided in conjunction with the previous circuit to accomplish (a) the elimination of a foot switch operation necessary in the prior art device for returning the workpiece holding bed or sewing table 6 to its original starting position, i.e. all the way back, and (b) eliminates in the operating sequence the necessity for activating the knee lever switch employed in the prior art for starting the sewing.

This operation is accomplished by means of the reset circuit acting as a programmer to allow the operation of the sewing circuit by merely depressing the foot switch.

The reset operation in line with the above accomplishments proceeds through the following events:
(a) During the sewing cycle previously explained, capacity 87 is charged by rectifying the A.C. from the "Start Sew Solenoid" operatively interconnected through its coil via resistance 96 and half wave silicone diode rectifier 95 during its conducting cycle. In order to provide the gate current necessary to activate the gate controlled diode 88, the A.C. current from the "Clamping Solenoid" is rectified upon activation of the "Clamps Up" circuit in FIG. 4e, which allows capacitor 87 to be discharged through the silicone controlled rectifier, i.e. triac 89, until capacitor 87 discharges below the breakdown voltage of Zener diode 89a at which time the triac 89 stops conducting.

This sequence momentarily energizes relay 91 (i.e. when the "Clamping Solenoid" becomes activated) thus de-energizing relays 63, 66, 68 and 78.

The same result of de-energizing the relays is also accomplished when a reset button 92 provided in the reset circuit is depressed by the operator to allow the repositioning of the pants leg and the pocket blank.

Capacitor 93 as well as capacitor 97 are provided for the necessary adjustment of the desired rectification function of the triac 89 and the gate controlled diode 88 and the values thereof are given in the table below with other values of the circuit components.

TABLE I

Sew Delay Circuit—FIG. 5—Item A

Capacitor 73—20 μf. at 50 volts
Resistance 74—1K
Variable resistance 75—25K
Zener diode 76—MZ1000–15
Transistors 77, 84—2N3704
Relay 78—KRP11DG–24 v.
Resistance 79—68
Capacitor 80—20 μf. at 50 volts
Resistance 81—2.7K
Resistance 82—4.7K
Zener diode 83—MZ1000–15
Diode 85—1N5061
Transistor 86—2N3703
Resistances:
    103—68
    104—4.7K
    105—4.7K
    106—4.7K
    107—4.7K Reset Circuit—FIG. 5—Item B Capacitor 87—30 μf. at 250 volts
Gate controlled diode 88—C106B2
Silicone controlled rectifier (triac) 89—40526
Zener diode 89a—MZ1000–8
Relay 91—KRP14AG–120 v.
Switch 92—Allen Bradley 800T–D6A
Capacitor 93—.01 μf. at 600 volts
Diode 94—1N5060

TABLE 1.—Continued
Reset Circuit—FIG. 5—Item B

Diode 95—1N5060
Resistance 96—1K
Capacitor 97—.01 µf. at 600 volts
Resistances:
    108—10K
    113—10K
    114—220
    115—1K
    116—470

In respect to the second, preferred embodiment, it is illustrated in FIG. 6. The circuit components which are the same in the first circuit and represented in FIG. 5 have been labeled with the same numerals. The pocket welting machine achieves the same result when controlled by the represented circuit device, however, it is improved in respect to the circuit labeled B and an additional workpiece removing device has been introduced as part of the reset circuit. Thus, the reset circuit has been improved to function more advantageously. This workpiece removing device will be explained in further detail below.

Turning now to the embodiment represented in FIG. 6, it functions essentially as the device illustrated in FIG. 5 except with the following differences, the "Reset" circuit labeled as B is operative after the stitching has been completed and the welt fingers (not shown, described in the above-mentioned patent) which invert the welting patch, as part of the the inverting operation, have made a tab cut, i.e. a V formed slit at the end of the cut pocket opening. (Shown in FIGS. 16, 58, 59, 62 and 63 of U.S. Pat. 2,573,359.) The prior art circuit device which controls these operations is illustrated in FIG. 4e.

The following machine sequence steps take place during this reset cycle.

Figure 4E:
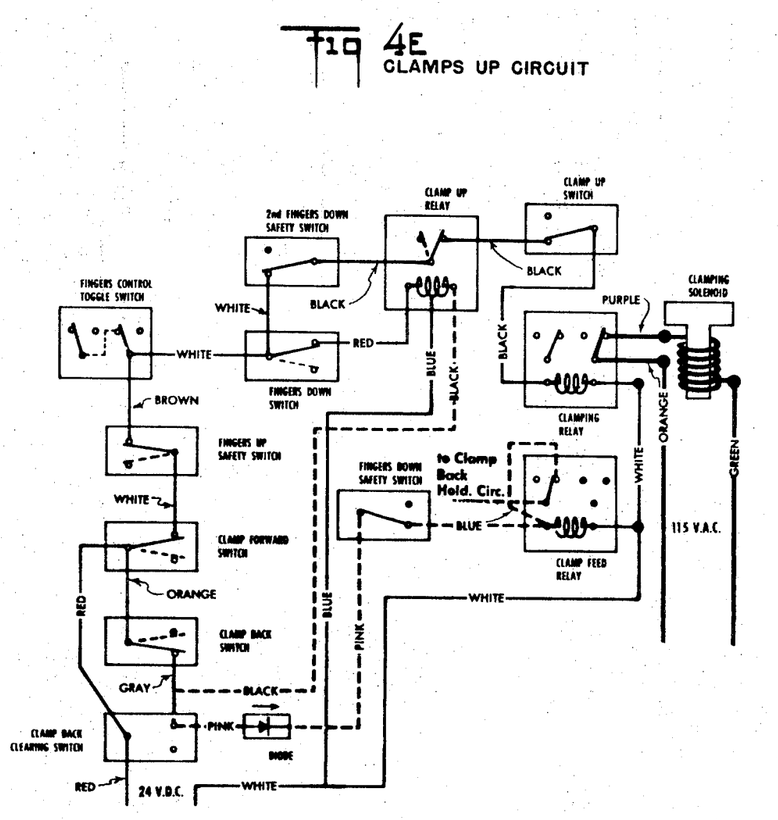
FIG. 4e illustrates an electrical control device of the conventional type and designated as "Clamps Up Circuit" which is operatively interconnected through the novel control device and foot switch and used in combination with the novel control device. This device is described in general terms in the above patent and corresponds to the circuit illustrated on page 51 of the Reece PW Instruction Manual.
Figure 4F:
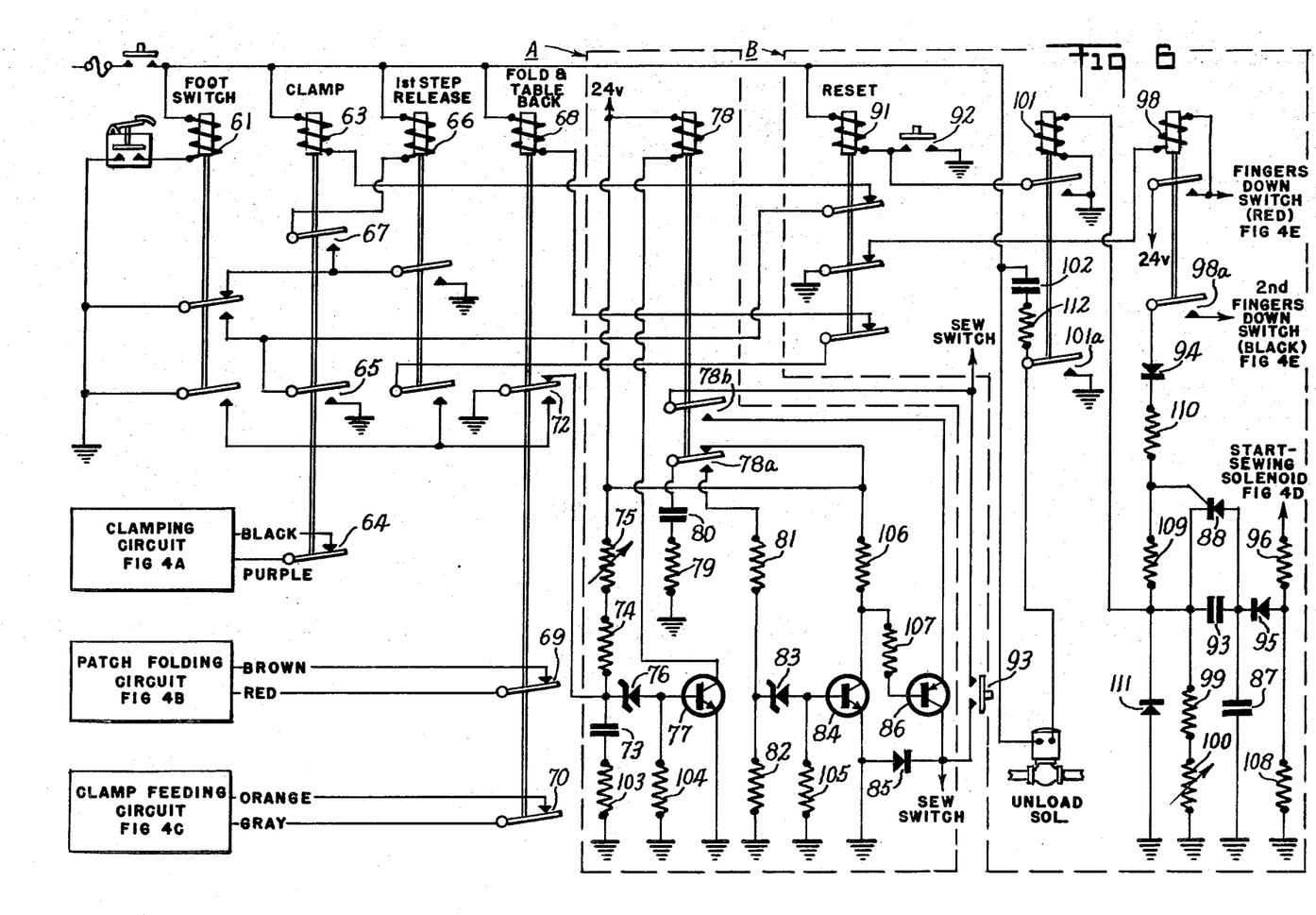

(1) Capacitor 87 is charged during the sewing cycle by rectifying the A.C. from the "Sew Solenoid" identified in FIG. 4d;

(2) When the welting patch folding arms and when the turning fingers including the tab cutters extend to the up position, relay 98 is energized by this event with the current coming from the switch identified as "Fingers Down Switch" shown in FIG. 4e when this switch is momentarily closed and is sending current through the "Clamps Up Relay" illustrated in FIG. 4e In FIG. 6, the connections to these switches have been color coded the same as in FIG. 4e.

(3) When the turning fingers drop to the down position, current coming from the switch identified as "2nd Fingers Down Switch" in FIG. 4e passes through the now closed contacts 98a relay 98 as the gate current for the gate controlled diode 88; which (a) allows capacitor 87 to discharge through resistance 99 and 100 and the relay coil of relay 101;
    (i) as a result of energizing relay 101, relay 91 is energized by providing ground therefor; relay 91 thus de-energizes all other energized relays;
    (ii) the "Unload" solenoid is activated via 101a contacts of relay 101 when this relay is activated operating a valve on a pneumatic fluid line which provides an air blast to eject the finished workpiece held on table 6 (described in the above-identified patent) of this machine at the same time when the workpiece holding clamps are in the up position, as a result of de-energizing of all relays. Capacitor 102 and resistance 112 are for contact arc suppression from the high voltage generated by the collapsing field of the "Unload" solenoid. An appropriate length of the air blast is obtained by a variable resistance 100 which is in parallel with the coil of relay 101.

As in the embodiment of FIG. 5, a "Reset" button 92 is provided in this embodiment which bypasses the "Reset" circuit in the event the operator desires to reset the machine for repositioning the pocket blank and welt materials after the clamps have secured the workpiece materials.

In the event it is necessary to rethread the needles of the sewing machine, a "Start Sew" button 93 is provided which by-passes the sew delay circuit labeled as A.

A "Clamp Safety Switch," which is normally closed, manually operated, and in the "Sewing Circuit" of these machines as shown in FIG. 4d, is turned off thus acting as a circuit breaker for the sew relay circuit. Moreover, during the operation of the welting patch folder arms (not shown, illustrated in U.S. Pat. 2,573,359) the machine will not sew. The combination of these two devices, i.e. "Start Sew" button 92 and "Clamp Safety Switch" enable the operator to rethread the needles of the machine.

After the completion of the needle rethreading operation, the "Clamp Safety Switch" is turned on and the "Start Sew" button is momentarily pressed. These two steps reactivate the "Sew Solenoid."

A foot switch which is useful for replacing the foot switch employed with the sewing machine is available from Square D Co., Milwaukee, Wis. and designated as Class 9002 Type AW-5. Although this switch normally contains two snap switches, only one switch is required for the present device. This switch is a single-pole, single throw snap switch.

In the table below are listed the values of the various circuit device components used in the device of the second embodiment.

TABLE II

Sew Delay Circuit—FIG. 6—Item A

Capacitor 73—20 µf.–50 v.
Resistance 74—1K
Variable resistance 75—25K
Zener diode 76—MZ1000+5
Transistors 77, 84—2N3704
Relay 78—KRP11–DG–24 v.
Resistance 79—68
Capacitor 80—20 µf.–50 v.
Resistance 81—2.7K
Resistances 82, 103 to 107—47K
Zener diode 83—MZ1000+5
Diode 85—1N5061
Transistor 86—2N3703
Capacitor 87—30 µf.–250 v.
Gate controlled diode 88—C106B2
Relay 91—KRP11AG–120 v.
Capacitor 93—.01 µf.–600 v.
Diodes:
    94—1N5060
    95—1N5061
Resistance 96—1K ½ watt
Relay 98—KRP-11DG 24 v.
Resistance 99—1K ½ watt
Resistance 100, variable—50K
Capacitor 102—.1 µf.
Resistances:
    108—10K
    109—22K
    110—68K
Diode 111—1N5061
Resistance 112—47K Although the present invention has been illustrated by describing the operative steps performed on a pants back pocket as the workpiece, the sewing machine modified with a device of the present invention is equally suitable when it is used for making button-hole pipings, coat pocket weltings, and any other piping or welting for which the Reece machines are suitable.

In comparison with the prior art devices, the present sequence of machine events which are operator controlled are as follows. At the beginning of the cycle, the material holding clamps are raised and the sewing table is rearward.

Step 1: The workpiece material consisting of a pants leg and pocket is placed in the machine.

Step 2: The foot switch is momentarily depressed thus lowering the material clamps.

Step 3: The welt patch is placed in the machine.

Step 4: The foot switch is momentarily depressed which completes the machine cycle, the operator work cycle is completed when the finished workpiece is removed from the machine.

In distinction from the above sequence, the prior art sequence is as follows:

At the beginning of the machine work cycle, the material clamps are raised and the sewing table is forward.

Step 1: Foot switch is depressed.

Step 2: Foot switch held down, this moves the sewing table rearwardly.

Step 3: The material is placed in the machine.

Step 4: The foot switch is operated by *raising* it partially to the second stage, thus lowering the material clamps.

Step 5: Foot switch is held at second stage.

Step 6: Welting patch is placed in machine.

Step 7: The foot pedal is completely released which operates the patch folder.

Step 8: The knee lever switch is actuated which begins the sewing cycle. The cycle ends with the sewing table being forward, and the operator removing the workpiece.

As it can be appreciated in the prior art sequence, the holding in a depressed position a foot switch, followed by careful raising to a next stage, and holding a foot switch suspended at the second stage are physically tiring and mentally fatiguing operator controlled steps.

In summary, the present invention provides an improved control means for operating a Reece welting machine by incorporating in the control circuits of these machines a control device which is a combination of specifically arranged relay circuits with co-acting delay and reset circuit devices. In the preferred embodiment, the reset circuit device is also coupled with a workpiece unload means which further enhance the usefulness of the thus modified pocket welting machine. As a result of the modified devices, the prior art machines have been operated with substantial increases in output from those previously obtainable with machines with heretofore available control devices. Moreover, the other attendant advantages mentioned above have also been observed.

What is claimed is:

1. In a sewing machine for producing weltings or pipings comprised of a standard, a bracket arm, a head with two needles, a bed with a reciprocally and longitudinally moving work plate for feeding a workpiece forwardly from the standard during the sewing cycle, workpiece clamps for securing said workpiece material to said work plate, a welting patch holding clamp, a welting patch guide, and welting patch folding arms, a slit forming means for cutting a slit in said workpiece and the welting patch, a tab cutting means, an inverting device for said welting patch, means for operatively driving said machine during an operative cycle and means to control the sewing machine, means for resetting the machine to its initial position, the combination comprising:

means for closing the workpiece holding clamps independently of subsequent operative events;

means for closing the welting patch holding clamp and lockstepping means for operatively sequencing the workpiece production cycle including means for moving the sewing table forwardly operatively lockstepped with the means for inverting the sewed welting patch; and means for raising the workpiece holding clamps simultaneously with the return of the sewing table rearwardly, said means for raising said clamps being operatively interconnected with the means for resetting the machine to its initial position when moving the sewing table rearwardly.

2. In a sewing machine for producing weltings or pipings by sewing a welting patch to a workpiece said machine being comprised of a standard, a bracket arm, a head with two needle bars having a needle on each, a bed with reciprocally and longitudinally moving work plate for feeding a workpiece during the sewing forwardly from the standard, a workpiece clamp for securing said workpiece material, a welting patch guide, and a welting patch folding arm, a slit forming means for cutting a slit in said workpiece and for cutting the welting patch operative during the sewing cycle, a tab cutting means, means for inverting a welting patch, means for operatively driving said machine during the operative work cycle, and means to control the machine operation events, the combination comprising:

means for moving the sewing table rearwardly operatively lockstepped with the termination of a welt patch inverting step;

means for raising the workpiece holding clamp, simultaneously with the return of said sewing table, operatively interconnected with the means for moving the sewing table rearwardly;

means for activating the workpiece holding clamps independently of subsequent sequencing events;

means for lockstepping after the placement of the welting patch on the workpiece subsequent means for operatively sequencing the workpiece production cycle.

3. In a sewing machine for producing weltings or pippings comprised of a standard, a bracket arm, a head with two needles, a bed with a reciprocally and longitudinally moving bed plate for feeding a workpiece forwardly from the standard during a sewing cycle, workpiece clamps for securing a workpiece material, means for activating said clamps, a welting patch guide means, welting patch folding and holding means, a slit forming means for cutting a slit in said workpiece and for cutting a slit in a welting patch, an inverting device for said welting patch, means for operatively driving said machine during an operative cycle and means to control the sewing machine, the combination comprising:

a first relay means;

means for energizing and de-energizing said first relay means operatively interconnected to said means for activating said clamps;

second relay activating means for operating said means for activating said clamps responsive upon energizing first relay means, said second relay means including means latchingly holding said clamps upon de-energizing said first relay means;

third relay means operatively responsive to said first relay means when said first relay means are de-energized and second relay means when said second relay means are energized;

means for energizing fourth relay means;

fourth relay means:

(a) means for activating said welting patch folding means operatively interconnected to said fourth relay means;

(b) means operatively interconnected to said fourth relay means and said patch folding means to delay the sewing control means;

(c) a sew solenoid relay and means for activating said sew solenoid relay, operatively interconnected to said fourth relay means and means for activating the sewing means, including means for terminating a dense stitching pattern;

means for de-energizing said second, third and fourth relay means and said sew solenoid relay; and means for resetting said bed plate rearwardly.

4. In a sewing machine according to claim 3 and wherein the resetting means comprise:

a condenser interconnected to the sew solenoid via current rectifying means;

a first relay interconnected to the welt patch turning means and energized upon projection of said turning means upwardly;

a gate controlled diode means, the gate control means of which is operatively activated by a solenoid means for disengaging the workpiece holding clamps, said diode means being operatively interconnected to
  (a) a relay operated means for unloading the workpiece; and
  (b) relay means for de-energizing the energized first, second, third and fourth relay means.

5. In a sewing machine according to claim 3 and wherein the means for delaying sewing comprise:

a condenser, operatively interconnected with said fourth relay means, when the same relay means are energized, a diode means, a trnasistor means operatively triggered by said condenser via said diode means, a relay means for activating said sewing means.

6. In a sewing machine according to claim 3 and wherein the means for terminating a dense stitching pattern comprise:

delay circuit means including a current source and
  (a) a relay means for activating the sew solenoid;
  (b) a first transistor means base biased when said last named relay means are energized;
  (c) a second transistor means operatively interconnected to said first transistor means and said sew solenoid and base biased after said first transistor means is base biased;
  (d) a capacitor means dischargingly interconconnected to said last named relay means and said first and second transistor means;
  (e) a diode means;
  (f) a latching means for holding said sew solenoid operative during a sewing cycle; said capacitor operatively interconnected via said diode means and said first and second transistor means to render said first and second transistor means conducting for a predetermined time; said latching means operatively activated when said first and second transistor means are conducting, and
  (g) a switch means operative after said transistor means are nonconductive and operatively interconnected to a dense stitching pattern terminating means.

References Cited
UNITED STATES PATENTS 2,573,359   10/1951   Rich _________________ 112—65

OTHER REFERENCES

Reece Series PW Pocket Welting Machine Instruction Manual, second edition, dated February 1965.

H. HAMPTON HUNTER, Primary Examiner